Patented Oct. 30, 1923.

1,472,343

UNITED STATES PATENT OFFICE.

WERNER SIEBERT, OF LAUFENBURG, AARGAU, SWITZERLAND, ASSIGNOR TO NITRUM AKTIENGESELLSCHAFT, OF ZURICH, SWITZERLAND, A CORPORATION OF SWITZERLAND.

PROCESS FOR OBTAINING PURE NITRIC ACID FROM NITROUS GASES.

No Drawing.     Application filed May 13, 1922. Serial No. 560,727.

*To all whom it may concern:*

Be it known that I, WERNER SIEBERT, a citizen of the Republic of Germany, residing at Laufenburg, Aargau, Switzerland, have invented certain new and useful Improvements in a Process for Obtaining Pure Nitric Acid from Nitrous Gases, of which the following is a specification.

In manufacturing nitric acid by means of the electric arc, disintegration of the material of the electrodes carrying the arc occurs to some degree, and the material separated is then carried off by the gas-current in form of a very fine powder. During the process of the absorption of the nitrous gases obtained through the arc, this fine powder is dissolved in the nitric acid and contaminates the latter to such an extent as to make it more or less useless for technical purposes. Such impurities are especially undesirable when iron electrodes are employed, because nitric acid for technical use should only contain a particularly low percentage of iron. Now it has been found that the solution of such impurities in the nitric acid can easily be prevented if the absorption of the nitrous gases takes place at a sufficiently low temperature as at about zero degrees centigrade or below, and if the resultant acid is immediately passed through a fine filter. In this manner a clear acid practically free of iron is obtained, containing but a few hundredths of a gram of impurities to the liter. In order to maintain the desired temperature during the time of absorption, it is necessary to abstract all the reaction heat caused by the transformation of $NO_2$ into $HNO_3$; and moreover the mixture of oxygen and nitrogen gases must be sufficiently cooled, because this mixture, after leaving the electric furnace and the directly coupled boiler and cooler, has a temperature that is far above 0° C. It has been found to be especially advantageous to effect this cooling down by feeding the absorption towers through which the nitrous gases pass with nitric acid, which itself is kept at 0° C. or below in coolers placed outside the towers, so that there is no higher temperature in any portion of the system. Only in this manner it is possible to prevent the solution of the fine powder thrown off from the electrodes. The resultant nitric acid is then passed through a very fine filter, without previous heating, thus giving a pure acid.

I claim:—

1. A process for obtaining pure nitric acid from nitrous gases containing impurities in form of a fine powder, in which the nitrous gases and the nitric acid are kept in all parts of the absorption system at a temperature about 0° C. so that solution of the impurities in the nitric acid is prevented, and in which the undissolved impurities are subsequently removed.

2. A process for obtaining pure nitric acid from nitrous gases containing impurities in form of a fine powder, in which the nitrous gases and the nitric acid are kept in all parts of the absorption system at a temperature not above zero degrees centigrade thus preventing solution of the impurities in the nitric acid, and in which the impurities are removed by filtration.

3. A process for obtaining pure nitric acid from nitrous gases containing impurities in form of a fine powder, in which the absorption towers are supplied with cooled nitric acid for keeping the nitrous gases and the nitric acid in all parts of the absorption system at a temperature of about 0° C. so that solution of the impurities in the nitric acid is prevented, and in which the undissolved impurities are subsequently removed.

In testimony whereof I affix my signature.

Dr. WERNER SIEBERT.